(12) United States Patent
O'Brien et al.

(10) Patent No.: US 7,806,325 B2
(45) Date of Patent: Oct. 5, 2010

(54) CONTACT-LESS TAG WITH SIGNATURE, AND APPLICATIONS THEREOF

(75) Inventors: William G. O'Brien, Nanaimo (CA); Tet Hin Yeap, Ottawa (CA)

(73) Assignee: BCE Inc., Verdun, Quebec (CA)

( * ) Notice: Subject to any disclaimer, the term of this patent is extended or adjusted under 35 U.S.C. 154(b) by 0 days.

(21) Appl. No.: 12/314,458

(22) Filed: Dec. 11, 2008

(65) Prior Publication Data

US 2009/0159666 A1 Jun. 25, 2009

Related U.S. Application Data

(63) Continuation of application No. PCT/CA2007/002343, filed on Dec. 20, 2007.

(51) Int. Cl.
*G06K 5/00* (2006.01)
(52) U.S. Cl. .................. 235/380; 235/382; 235/372
(58) Field of Classification Search ................ 235/375, 235/380, 382, 382.5
See application file for complete search history.

(56) References Cited

U.S. PATENT DOCUMENTS

| | | | |
|---|---|---|---|
| 5,805,702 A | 9/1998 | Curry et al. | |
| 6,842,106 B2 | 1/2005 | Hughes et al. | |
| 6,981,151 B1 | 12/2005 | Groeneveld et al. | |
| 7,000,114 B1 | 2/2006 | Hasebe et al. | |
| 7,246,744 B2 | 7/2007 | O'Brien et al. | |
| 2003/0120925 A1 | 6/2003 | Rose et al. | |
| 2004/0252025 A1 | 12/2004 | Silverbrook et al. | |
| 2005/0190892 A1 | 9/2005 | Dawson et al. | |
| 2006/0116899 A1 | 6/2006 | Lax et al. | |
| 2007/0008135 A1 | 1/2007 | Sajkowsky | |
| 2007/0022045 A1 | 1/2007 | Lapstun et al. | |
| 2007/0057768 A1 | 3/2007 | Zeng et al. | |
| 2007/0095928 A1 | 5/2007 | Balinsky et al. | |
| 2008/0011835 A1* | 1/2008 | Kwon et al. | ................. 235/382 |
| 2008/0013807 A1* | 1/2008 | Bonalle et al. | .............. 382/124 |
| 2008/0244271 A1 | 10/2008 | Yu | |

(Continued)

FOREIGN PATENT DOCUMENTS

CA 2290170 C 7/2000

(Continued)

OTHER PUBLICATIONS

International Search Report mailed on Feb. 17, 2009 in connection with International Application No. PCT/CA2008/002225.

(Continued)

*Primary Examiner*—Karl D. Frech

(57) ABSTRACT

A method, comprising: obtaining a signature from a contactlessly readable tag; decrypting the signature with a key to obtain (i) a candidate identifier and (ii) a scrambling code associated with the signature; and validating the candidate identifier based on at least one of the scrambling code and the signature. Also, a system, comprising: at least one tag reader configured to receive a plurality of signatures released by a respective plurality of tags, including a particular signature released by a particular one of the tags, and to cause decryption of the particular signature with a key to obtain (i) a candidate identifier, and (ii) a scrambling code associated with the signature; and a processing entity configured to effect validation of the candidate identifier based on at least one of the scrambling code and the signature.

57 Claims, 11 Drawing Sheets

U.S. PATENT DOCUMENTS

| | | |
|---|---|---|
| 2009/0160615 A1 | 6/2009 | O'Brien et al. |
| 2009/0160649 A1 | 6/2009 | O'Brien et al. |
| 2009/0161872 A1 | 6/2009 | O'Brien et al. |
| 2009/0216679 A1 | 8/2009 | Yeap et al. |
| 2009/0240946 A1 | 9/2009 | Yeap et al. |

FOREIGN PATENT DOCUMENTS

| | | |
|---|---|---|
| EP | 1 626 363 A1 | 2/2006 |
| EP | 1 708 468 A1 | 10/2006 |
| WO | 99/43113 A1 | 8/1999 |
| WO | 2006/024816 A2 | 3/2006 |
| WO | 2006/039771 A1 | 4/2006 |
| WO | 2007/038896 A2 | 4/2007 |

OTHER PUBLICATIONS

Written Opinion of the International Searching Authority mailed on Feb. 17, 2009 in connection with International Application No. PCT/CA2008/002225.

International Search Report mailed on Aug. 20, 2009 in connection with International Patent Application No. PCT/CA2008/002224, 3 pages.

Written Opinion of the International Searching Authority mailed on Aug. 20, 2009 in connection with International Patent Application No. PCT/CA2008/002224, 6 pages.

International Search Report of corresponding International Application No. PCT/CA2007/002343 mailed on Sep. 30, 2008, 32 pages.

Written Opinion of the International Searching Authority of corresponding International Application No. PCT/CA2007/002343 mailed on Sep. 30, 2008, 8 pages.

"3M Digital Materials Flow Management", © 2000, 3M IPC., 2 pages, 3M Library Systems, St. Paul, MN, U.S.A., www.3M.com/library.

Fred Niederman et al., "Examining RFID Applications in Supply Chain Management", Communications of the ACM, Jul. 2007/vol. 50, No. 7, pp. 93-101.

"Real-Time Location Identification for IP Phones" Redsky Network Discovery, © 2006 RedSky Technologies, Inc., Chicago, IL, U.S.A., 2 pages, www.redskyE911.com.

"Contactless Smart Cards vs. Epc Gen 2 RFID Tags: Frequently Asked Questions", Smart Card Alliance Identity Council, Jul. 2006, Smart Card Alliance © 2006, 6 pages.

Javed Sikander, "RFID Enabled Retail Supply Chain", © 2007 Microsoft Corp., Apr. 2005, Aug. 2, 2007, 21 pages, http://msdn2.microsoft.com/en-us/library/ms954628(d=printer).aspx.

Marcel Queisser et al., "Cataloging RFID Privacy and Security", Databases and Distributed Systems Group, as early as Apr. 18, 2007, 6 pages, Germany.

Tom Kevan, "Sorting out the RFID tag debate: read-only or read/write? Weigh all . . . ", Aug. 1, 2007, 2 pages, http://findarticles.com/p/articles/mi_m0DIS/is_12_4/ai_112366616/print.

European Search Report completed on Feb. 26, 2010 in connection with European Patent Application No. 09 18 0219, 10 pages.

Zhou Wang et al., "Cooperation Enhancement for Message Transmission in VANETs", Wireless Personal Communications, Kluwer Academic Publishers, DO, vol. 43, No. 1, Dec. 20, 2006, iSSN: 1572-834X, pp. 141-156.

International Search Report mailed on Aug. 31, 2009 in connection with International Patent Application No. PCT/CA2008/002226.

Written Opinion of the International Searching Authority mailed on Aug. 31, 2009 in connection with International Patent Application No. PCT/CA2008/002226.

* cited by examiner

CONTACT-LESS TAG WITH SIGNATURE, AND APPLICATIONS THEREOF

CROSS-REFERENCE TO RELATED APPLICATION

This application is a continuation, and claims the benefit under 35 USC 120, of International Application No. PCT/CA2007/002343 filed on Dec. 20, 2007 and hereby incorporated by reference herein.

FIELD OF THE INVENTION

The present invention relates generally to contact-less tags and, more specifically, to a contact-less tag having a signature as well as to applications using the properties of such a tag.

BACKGROUND

Contact-less tags, such as radio frequency identification (RFID) tags, are becoming increasingly commonplace in various commercial applications, two non-limiting examples of which include access control and inventory management.

An RFID tag affixed to an item stores a code (e.g., a bit pattern) that is output in contact-less fashion to a reader, either in response to a request from the reader or autonomously by the tag. The reader captures the bit pattern and then an action may be taken, depending on the commercial application at hand. For example, in an access control scenario, the captured bit pattern may reveal that the person presumed to be carrying the tag (by virtue of an association with the bit pattern) is—or is not—authorized to enter a building or operate a vehicle. In an inventory management scenario, the bit pattern may give an indication of items contained on a pallet, for example, which may result in certain decisions being taken regarding shipping or storage of these items.

In both cases, the ease with which an RFID tag may be read by a reader enables rapid processing but also may lead to problems. In the access control scenario, for example, an RFID tag of an individual authorized to access certain property may be interrogated and then the bit pattern cloned for use by an impostor to gain what is in fact unauthorized access to such property. Similarly, in the inventory management scenario, an acquired knowledge of the bit pattern associated with a certain item may allow a malicious party to gain intelligence about inventory locations that the item's rightful owner (which may include the manufacturer all the way down to the retail customer) may wish to keep secret.

In both of the above scenarios, it is apparent that what is relevant to a malicious party is the knowledge that a certain bit pattern output by a certain RFID tag will either give access to property or indicate the presence of a specific inventory item. Whether the bit pattern is itself an encrypted version of some original data is actually of no relevance to the malicious party. Thus, schemes based on straightforward encryption of the bit pattern do not mitigate the problems mentioned above.

Against this background, there is clearly a need in the industry for a contact-less tag having improved properties.

SUMMARY OF THE INVENTION

A first broad aspect of the present invention seeks to provide a method, which comprises obtaining a signature from a contactlessly readable tag; decrypting the signature with a key to obtain a candidate identifier and a scrambling code associated with the signature; and validating the candidate identifier based on at least one of the scrambling code and the signature.

A second broad aspect of the present invention seeks to provide a computer-readable medium comprising computer-readable program code which, when interpreted by a computing apparatus, causes the computing apparatus to execute a method. The computer-readable program code comprises first computer-readable program code for causing the computing apparatus to obtain a signature from a tag; second computer-readable program code for causing the computing apparatus to decrypt the signature with a key to obtain a candidate identifier and a scrambling code associated with the signature; and third computer-readable program code for causing the computing apparatus to validate the candidate identifier based on at least one of the scrambling code and the signature.

A third eleventh broad aspect of the present invention seeks to provide a system, which comprises at least one tag reader configured to receive a plurality of signatures released by a respective plurality of tags, including a particular signature released by a particular one of the tags, and to cause decryption of the particular signature with a key to obtain a candidate identifier and a scrambling code associated with the signature; and a processing entity configured to effect validation of the candidate identifier based on at least one of the scrambling code and the signature.

A fourth broad aspect of the present invention seeks to provide a system, which comprises means for receiving a plurality of signatures released by a respective plurality of tags, including a particular signature released by a particular one of said tags; means for decrypting the particular signature with a key to obtain (I) a candidate identifier, and (II) a scrambling code associated with the signature; and means for validating the candidate identifier based on at least one of the scrambling code and the signature.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
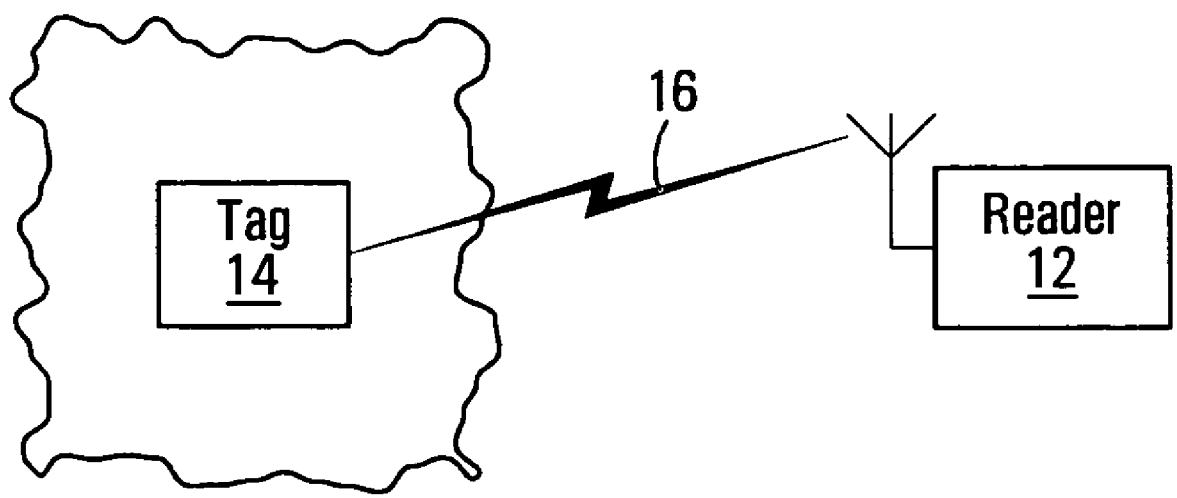
FIG. 1 is a block diagram of a system comprising a reader and a tag, in accordance with a non-limiting embodiment of the present invention.

With reference to FIG. 1, there is shown a system comprising a reader 12 and a tag 14. Communication between the reader 12 and the tag 14 occurs over a contact-less medium 16. In a specific non-limiting embodiment, the contact-less medium 16 is a wireless medium that may include a spectrum of radio frequencies. Depending on the application at hand, the tag 14 could be affixed to: an item for sale, goods during transportation, a person's clothing, an animal, a piece of equipment (including communications equipment such as wireless communications equipment) and so on. For its part, the reader 12 can be fixed or mobile. In the fixed scenario, the reader 12 could be located at any desired position within a building, vehicle, warehouse, campus, etc. In the mobile scenario, the reader 12 could be implemented in a handheld or portable unit, for example.

Figure 2:
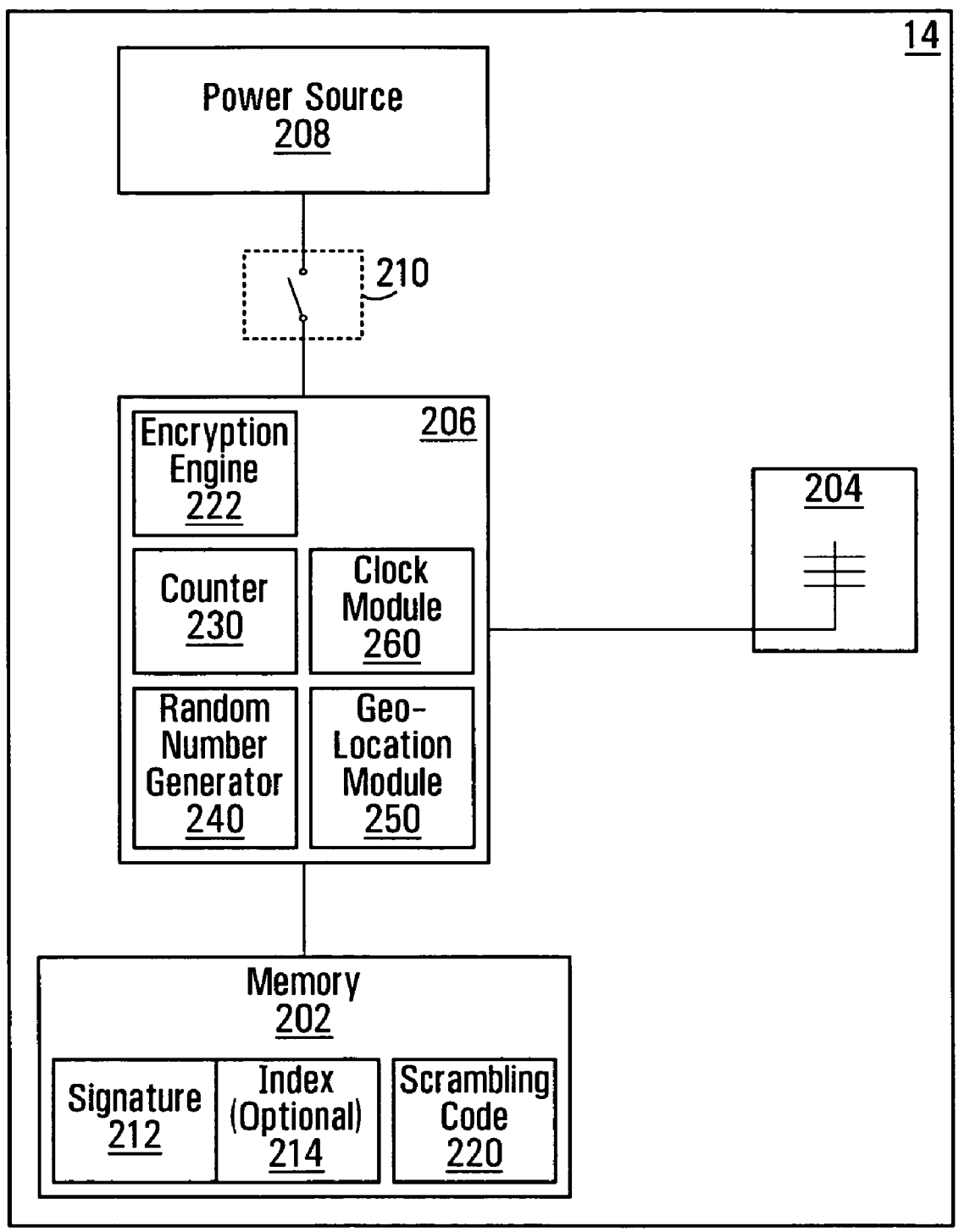
FIG. 2 is a block diagram showing details of the tag, in accordance with a non-limiting embodiment of the present invention.

FIG. 2 shows details of the tag 14, in accordance with a specific non-limiting embodiment of the present invention. The tag 14 comprises a memory 202, a transceiver 204 (including an antenna), a controller 206 and a power source 208.

The memory 202 stores a current signature 212. In addition, the memory 202 may store a program for execution by the controller 206, including computer-readable program code for causing the controller 206 to execute various steps and achieve wide-ranging functionality. In a non-limiting embodiment, the current signature 212 can take the form of a bit pattern having a certain number of bits. In accordance with an embodiment of the present invention, the bit pattern exhibited by the current signature 212 is dynamic, that is to say the current signature 212 changes over time.

The controller 206 executes various functions that allow communication to take place via the transceiver 204 between the tag 14 and an external reader such as the reader 12. In what follows, communications will hereinafter be referred to as occurring with the reader 12 although it will be appreciated that the tag 14 may communicate similarly with other external readers that it encounters.

As part of its functionality, the controller 206 is operative to retrieve the current signature 212 from the memory 202 and to release the current signature 212 via the transceiver 204. Alternatively, depending on the computational capabilities of the controller 206, the controller 206 can be operative to compute the current signature 212 on demand and to release via the transceiver 204 the current signature 212 so computed.

It is recalled that in this embodiment, the current signature 212 is dynamic. Accordingly, the controller 206 is operative to communicate with the memory 202 in order to change the bit pattern of the current signature 212 stored in the memory 202. This can be achieved by executing diverse functionality that will be described in greater detail later on, and which may include implementing functional elements such as an encryption engine 222, a counter 230, a pseudo-random number generator 240, a geo-location module 250 and a clock module 260, among others.

The configuration of the power source 208 and its interrelationship with the controller 206 depend on whether the tag 14 is categorized as "passive", "active" or somewhere in between. Specifically, the tag 14 may be designed as "passive", whereby transmissions of the current signature 212 via the transceiver 204 are effected in response to detection of a burst of energy via the transceiver 204, such burst of energy typically coming from the reader 12 issuing a "read request". In this case, the controller 206 only needs to be powered during the short time period following the detection of the burst. In fact, the burst itself can charge the power source 208 for a brief period, enough to allow the controller 206 to cause transmission of the current signature 212 via the transceiver 204 in response to the read request. The current signature 212 may be extracted from the memory 202 or it may be generated on demand, upon receipt of the read request.

Alternatively, in some embodiments of an "active" tag, transmissions of the current signature 212 via the transceiver 204 are similarly effected in response to detection of a read request via the transceiver 204. In this case, the availability of the power source 208 allows the controller 206 to transmit the current signature 212 at a longer range than for passive devices. Certain active tags also have the capability to switch into a passive mode of operation upon depletion of the power source 208. In other embodiments of an active tag, transmissions of the current signature 212 are effected via the transceiver 204 at instances or intervals that are controlled by the controller 206. This can be referred to as autonomous (or unsolicited) issuance of the current signature 212. To this end, the controller 206 needs to be continuously powered from the power source 208.

Active and passive tags may have other features that will be known to those of skill in the art.

In still other cases, the power source 208 (either continually storing a charge or accumulating a sensed charge) can be connected to the controller 206 via a switch 210, which is optional. The switch 210 can be toggled between a first state during which an electrical connection is established between the power source 208 and the controller 206, and a second state during which this electrical connection is broken. The switch 210 is biased in the second state, and can be placed into the first state. Toggling into the first state can be achieved by a burst of energy that is sensed at a sensor (not shown) or by use of an activation element. In various non-limiting embodiments, the activation element may be a touch-sensitive pad on a surface of the tag 14, or a mechanical component (e.g., a button). Placing the switch 210 into the first state may also trigger the controller 260 to change the current signature 212 in the memory 202.

Figure 3:
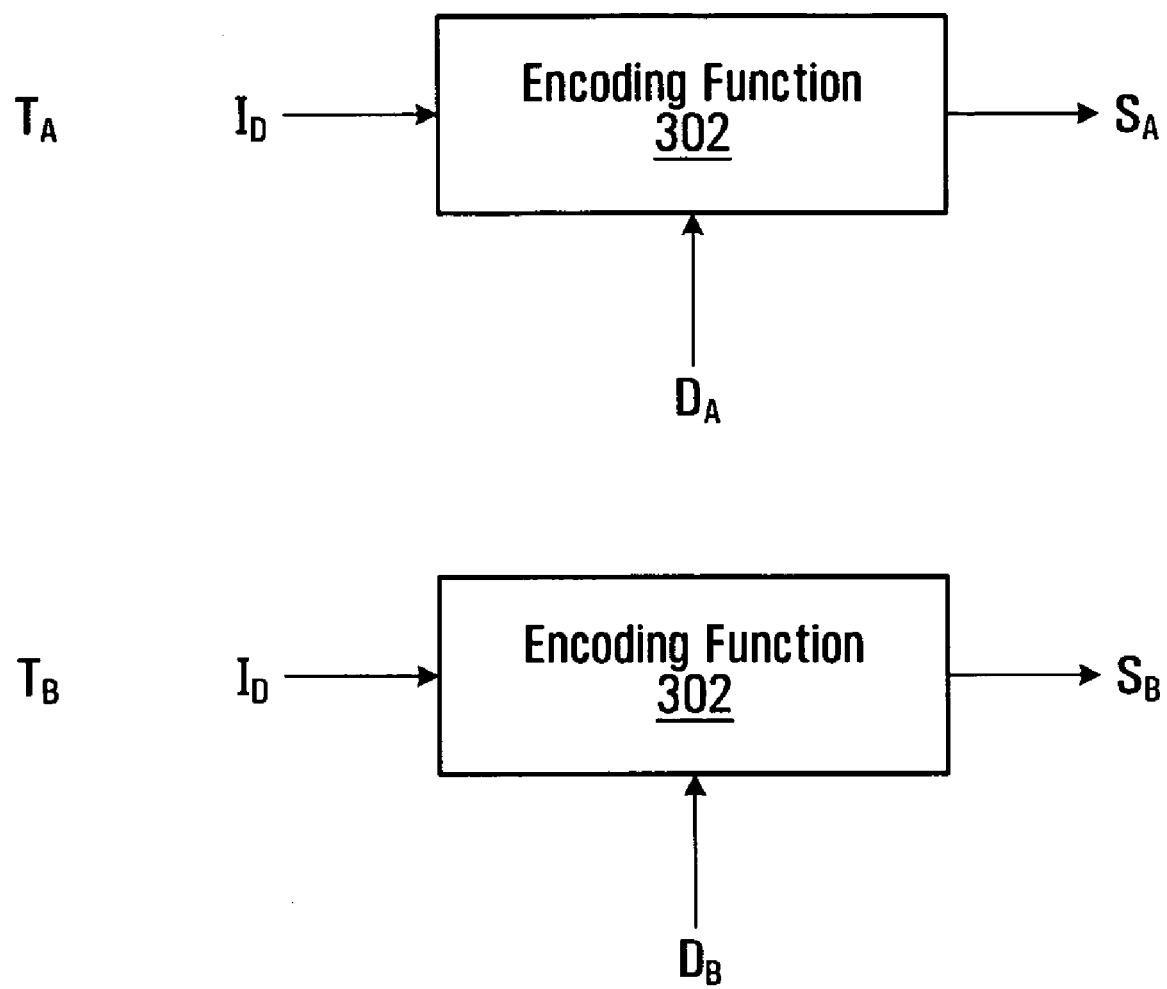
FIG. 3 illustrates a decoding function implemented by a controller in the tag, for generation of a signature at two points in time.

With reference now to FIG. 3, there is shown conceptually how the current signature 212 stored in the memory 202 may change over time. Specifically, different versions of the current signature 212 (denoted $S_A$ and $S_B$) are generated by an encoding function 302 implemented by the controller 206. For notational convenience, the current signature 212 is used to denote which of the two signatures $S_A$, $S_B$ is currently stored in the memory 202. The encoding function 302 generates the signatures $S_A$ and $S_B$ by encoding a common "identifier" (denoted $I_D$) with a respective "additional data set" (denoted $D_A$ and $D_B$) at respective time instants (denoted $T_A$ and $T_B$). Thus, at $T_A$, the signature $S_A$ is generated by encoding the identifier $I_D$ with the additional data set $D_A$, whereas at $T_B$, the signature $S_B$ is generated by encoding the identifier $I_D$ with the additional data set $D_B$. While in this example, two time instants are shown and described, this is solely for simplicity, and it should be understood that in actuality, the current signature 212 may change many times.

The identifier $I_D$ is constant, and in one embodiment conveys information about the item, animal, vehicle, piece of equipment, etc., to which the tag 14 is affixed. Examples of such information include, without limitation: a serial number, a universal product code (UPC), a vehicle registration number (VIN) and a customized identifier. In another embodiment, the identifier $I_D$ conveys information about an expected user of the vehicle, clothing or mobile communication device, computer, restricted access area, network, etc., to which the tag 14 is affixed. Examples of such information include, without limitation: a name, an ID number, a driver's license number, an account number and login credentials.

In accordance with a non-limiting embodiment of the present invention, the additional data sets $D_A$ and $D_B$ are different, which makes both signatures $S_A$, $S_B$ different. In fact, the two signatures $S_A$, $S_B$ will appear scrambled relative to one another due to use of the encryption engine 222 within the encoding function 302. More specifically, the signatures $S_A$ and $S_B$ can be generated from the additional data sets $D_A$ and $D_B$ in a variety of ways, two of which will be described herein below.

First Approach

Figure 4A:
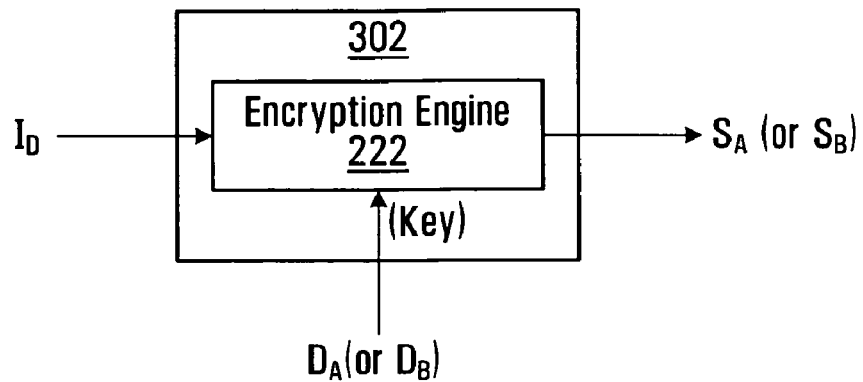
FIGS. 4A and 4B depict two possible functional architectures for generation of a signature.

In a first approach, described with reference to FIG. 4A, the identifier $I_D$ is encrypted by the encryption engine 222 with a dynamic key—represented by the additional data sets $D_A$, $D_B$ themselves, resulting in the two signatures $S_A$, $S_B$. The two signatures $S_A$, $S_B$ will be different because the additional data sets $D_A$, $D_B$ are different. In fact, they will appear scrambled relative to one another when observed by someone who has not applied a decryption process using a counterpart to the keys used by the encryption engine 222.

It will be noted that in order to make the first approach practical, the reader 12 needs to have knowledge of which key (i.e., which of the additional data sets $D_A$, $D_B$) was used for encryption of a received one of the signatures $S_A$, $S_B$, in order to effect proper decryption and recover the identifier $I_D$. For this purpose, in order to assist the reader 12 in identifying the correct key to be used for decryption, and with reference again to FIG. 2, the current signature 212 may be accompanied by an index 214 also stored in the memory 202. The index 214 may point the reader 12 to the correct key to be used. The reader 12 may have access to a key database (not shown) for this purpose.

For example, consider the case where the keys (in this case, the additional data sets $D_A$, $D_B$) correspond to outputs of the pseudo-random number generator 240 having a seed known a priori to the tag 14 and to the reader 12. Here, at $T_A$, the index 214 may indicate the sequential position in the output of the pseudo-random number generator 240 that corresponds to the additional data set $D_A$, while at $T_B$, the index 214 may indicate the sequential position in the output of the pseudo-random number generator 240 that corresponds to the additional data set $D_B$. The reader 12 can then easily find the value occupying the correct sequential position in the output of an identical local pseudo-random number generator and effect successful decryption of the received signature ($S_A$ or $S_B$). Alternatively, the keys (in this case, the additional data sets $D_A$, $D_B$) are provided by the reader 12. This can be done where the reader 12 (or an entity associated therewith) decides that a change in the current signature 212 is required. As a variant, the reader 12 may issue a trigger which, when received by the controller 206, causes the controller 206 to effect a change in the current signature 212. In such cases, changes to the key (and thus to the current signature 212) are effected by the controller 206 in response to triggers received from the reader 12.

Second Approach

Figure 4B:
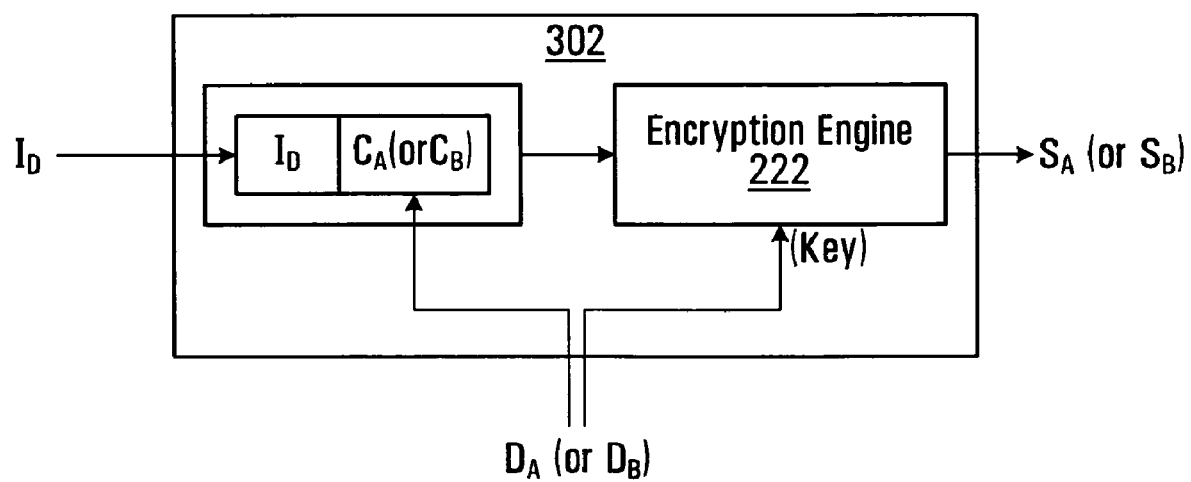

For other applications, the approach of FIG. 4B may be useful. Here, the identifier $I_D$ is augmented with differing scrambling codes (denoted $C_A$ and $C_B$), and then encrypted by the encryption engine 222 with a common key (denoted K), thus producing the two signatures $S_A$, $S_B$. The "additional data set" $D_A$ used for encryption at $T_A$ is therefore composed of the key K and the scrambling code $C_A$, while the "additional data set" $D_B$ used for encryption at $T_B$ is composed of the same key K and the scrambling code $C_B$. The encryption process can be designed so that small differences (in terms of the number of bits where there is a difference) between the scrambling codes $C_A$ and $C_B$ will cause large differences (in terms of the number of bits where there is a difference) in the resultant signatures $S_A$ and $S_B$. Thus, the scrambling codes $C_A$, $C_B$ have the effect of scrambling (i.e., randomizing) the resultant signatures $S_A$, $S_B$.

The controller 206 is responsible for determining which scrambling code is to be used to generate a particular signature at a particular time instant. The current version of the scrambling code can be stored in the memory 202 and is denoted 220 for convenience. It will be appreciated based on the above description that the scrambling code $C_A$ corresponds to the current scrambling code 220 at $T_A$ and that the scrambling code $C_B$ corresponds to the current scrambling code 220 at $T_B$.

Continuing with the second approach, several classes of embodiments are contemplated for changing the current scrambling code 220. In a first class of embodiments relevant to the approach of FIG. 4B, the current scrambling code 220 is changed in a way that can be predicted by the reader 12, that is to say, where the reader 12 (or an entity associated therewith) has knowledge of how each successive scrambling code is generated.

For example, the current scrambling code 220 can be changed each time (or, generally, each $N^{th}$ time where $N \geq 1$) that the controller 206 receives a read request or releases the current signature 212 in response to a read request. This can ensure that the current signature 212 is different each $N^{th}$ time that the controller 206 receives a read request. Alternatively, the current scrambling code 220 is changed every the current scrambling code 220 can be changed every set period of time (ex. every N seconds, minutes, hours, days, etc.). The variations in the current scrambling code 220 may governed in a variety of ways that are predictable to the reader 12. For example, the controller 206 may implement a counter 230, whose output is incremented (by a step size that can equal unity or can be negative, for example) after each $N^{th}$ time that the controller 206 responds to a read request received from a nearby reader (or each N seconds, etc.). If the current scrambling code 220 is set to correspond to the current output of the counter 230, then the scrambling codes $C_A$, $C_B$ used to generate the two signatures $S_A$, $S_B$ will differ by the step size.

Alternatively, the controller 206 may implement the aforesaid pseudo-random number generator 240, which produces an output that depends on one or more previous values of the output and on a seed. If the current scrambling code 220 is set to correspond to the current output of the pseudo-random number generator 240, then the scrambling codes $C_A$, $C_B$ used to generate the two signatures $S_A$, $S_B$ will differ in accordance with the characteristics of the pseudo-random number generator 240.

Other variants will become apparent to those of skill in the art without departing from the scope of the present invention.

In a second class of embodiments relevant to the approach of FIG. 4B, the additional data sets $D_A$, $D_B$ are not only predicted by the reader 12 but are actually controlled by the reader 12. This can be useful where the reader 12 (or an entity associated therewith) decides that a change in the current signature 212 is required. Alternatively, and recognizing that the key K is common to both of the additional data sets $D_A$, $D_B$, the reader 12 could supply the unique portions of the additional data sets $D_A$, $D_B$, namely the scrambling codes $C_A$, $C_B$.

As a variant, the reader 12 may simply issue a trigger which, when received by the controller 206, causes the controller 206 to effect a change in the current signature 212. In such cases, changes to the current signature 212 are effected by the controller 206 in response to triggers received from the reader 12.

In a third class of embodiments relevant to the approach of FIG. 4B, it may be desired to change the signatures $S_A$, $S_B$ in a stochastic way, that is to say, without the need to follow an underlying pattern that could be predicted by the reader 12.

For example, the controller 206 may implement the aforementioned geo-location module 250, which is configured to output a current spatial position of the tag 14 or of an item or person to which it is affixed. If the current scrambling code 220 is set to correspond to the current output of the geo-location module 250, then the scrambling codes $C_A$, $C_B$ used to generate the two signatures $S_A$, $S_B$ will differ in a stochastic fashion.

Alternatively, the controller 206 may implement a clock module 260, which is configured to determine a current time. If the current scrambling code 220 is set to correspond to a value measured by the clock module 260 (e.g., number of milliseconds elapsed since midnight of the day before), then the scrambling codes $C_A$, $C_B$ used to generate the two signatures $S_A$, $S_B$ will differ in a stochastic fashion.

Figure 5:
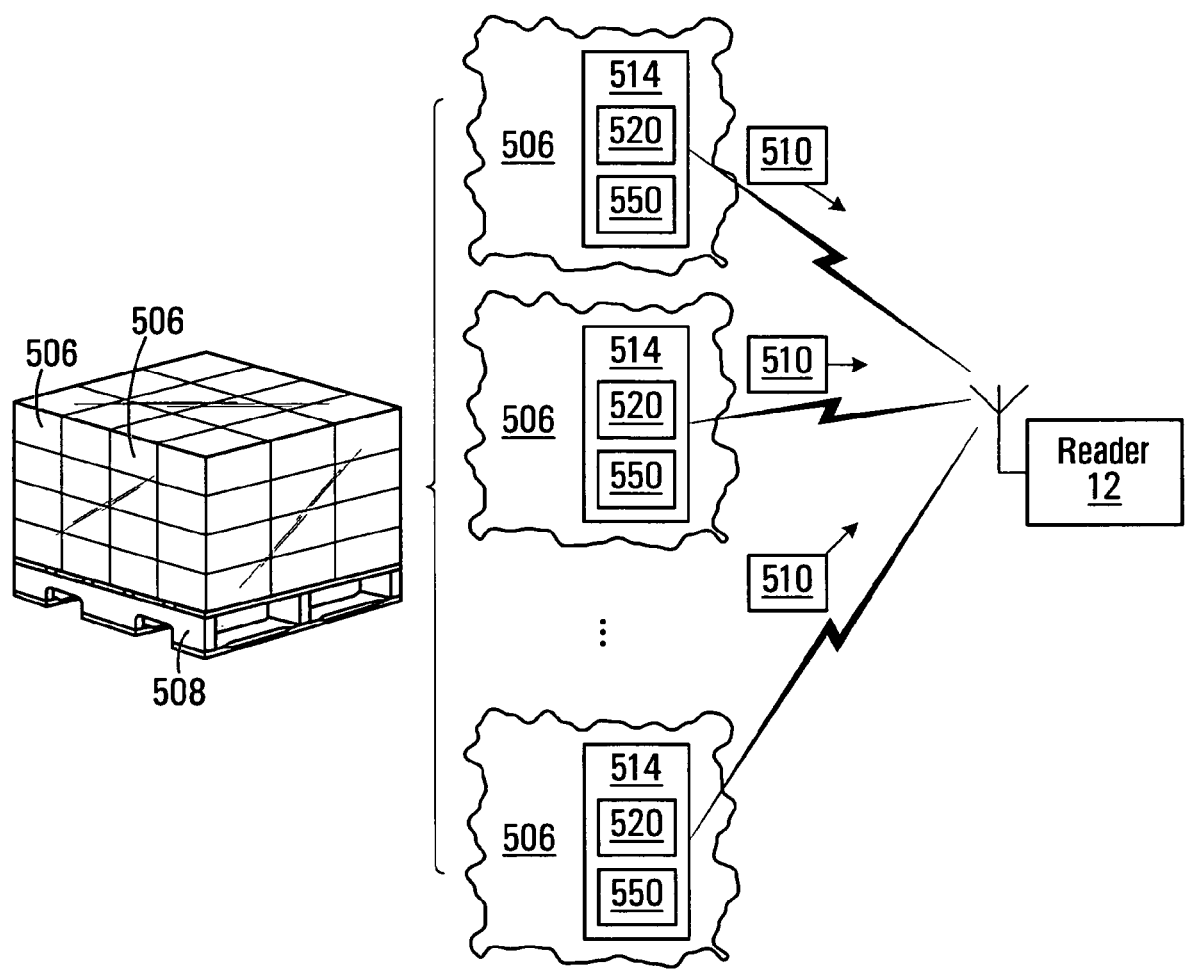
FIG. 5 illustrates application of an embodiment of the present invention in an inventory management context.

While the above embodiments have focused on temporal variations in the current signature 212 stored in the memory 202 of the tag 14, it is also within the scope of the present invention for the current signature 212 stored in the memory 202 of two different tags to be different at a common time instant (e.g., at a time when the tags are being read in bulk). This can be referred to as spatial scrambling. More particularly, with reference to FIG. 5, a plurality of tags 514 are affixed to a number of units 506 of a particular article. The units 506 may be arranged on a pallet 508, on a shelf or in a container, for example. To take a simple non-limiting example, the article in question can be a pair of denim jeans of a certain brand, size, style and color. Of course, the article could be any other item of which multiple units are available, such as a consumer product, food product, vehicle, etc. Other possibilities that may appear to one of skill in the art are within the scope of the present invention.

The tags 514 store respective signatures 510 that are each derived by encrypting an identifier 550 (common to the tags 514) and a respective one of a plurality of current scrambling codes 520 (different for the various tags 514) with a common key. The common identifier 550 can be used to identify the article in question (in this case, a pair of jeans of a particular brand, size, style, color, etc.). To ensure that the signatures 510 appear scrambled while nevertheless encrypting the common identifier 550, approaches such as the following may be taken.

In one non-limiting approach, a centralized entity generates unique current scrambling codes 520 and unique signatures 510 for each of the tags 514. The tags 514 are pre-loaded with their respective unique signatures 510 before being affixed to the units 506. In this approach, the unique signatures 510 are fixed, as a result of which the tags 514 can be greatly simplified since they do not need to perform any processing functions. Practically speaking, this allows a distributor to purchase a plurality of tags 514 that have been pre-loaded with unique signatures 510 in order to securely identify the units 506 of a particular article.

In another non-limiting approach, the tags 514 may each operate a respective clock module which, though structurally identical, may output different results, due to differences in oscillation characteristics (e.g., the oscillation crystals used, etc.) This will result in differences between the current scrambling code produced based on an output of the clock module of one of the tags 514 and the current scrambling code produced based on an output of the clock module of another one of the tags 514, albeit at the same time instant.

In yet another non-limiting approach, different current scrambling codes 520 can be produced as a result of the tags 514 each operating a respective pseudo-random number generator using a different seed, which could be pre-loaded by the above mentioned centralized entity.

Still other ways of making the current scrambling codes 520 different among the various tags 514 are within the scope of the present invention.

It is noted that the signatures 510 will tend to be widely varying even if the differences in the current scrambling codes 520 used to generate them are small, this effect being due to application of an encryption process, even when a common key is used. In fact, to an observer not equipped with the complementary key for decryption (which may be the same as the common key in a symmetric encryption scenario), the signatures 510 corresponding to the various units 506 on the pallet 508 will appear scrambled. This provides protection against external observers (e.g., thieves, corporate intelligence investigators) who may have gathered knowledge of signatures output by one or more units of the article in the past (e.g., from a previous purchase—or knowledge of a previous shipment—of the same brand, size, style and color of jeans) and are now on the lookout for the presence of units of the same article on the pallet 508. On the other hand, by using the appropriate key in order to decrypt any of the signatures 510, then no matter how diverse one such signature is from another, the common identifier 550 will be revealed alongside a stochastically derived scrambling code.

In order to allow the reader 12 to identify the appropriate key for decryption, each of the signatures 510 may be accompanied by the aforesaid index 214 stored in the memory 202. The index 214 may point the reader 12 to the correct key for decryption. For example, the index 214 could be a piece of public information such as a manufacturer identification code or a product category, such information being common to the units 506 but sufficiently generic to be of little value to an outside observer. This will allow the reader 12 (or an entity associated therewith) to select the correct key for decryption by accessing a table of keys (not shown) on the basis of the index. Such an approach can be useful to accelerate the decryption process and reduce the incidence of false positives (successful but inadvertent decryption of the wrong identifier) when multiple keys are potentially available to the reader 12.

It should also be appreciated that the signatures 510 on the various tags 514 can, in addition, be designed to change in a dynamic fashion (as described earlier), thus providing, in addition to spatial scrambling of the signatures 510, temporal scrambling of the signatures 510 that leads to even greater security vis-à-vis external observation.

In view of the foregoing, it should thus be appreciated that a common identifier, which is encoded within a plurality of signatures that vary over space (for multiple tags) and/or time (for the same tag), can be extracted by the reader 12 (or an entity associated therewith) by utilizing the appropriate key for decryption. This allows the reader 12 (or an entity associated therewith) to perform (I) validation of the identifier based on the signature and/or the scrambling code; and/or (II) an action related to identification, based on the identifier.

Both of these scenarios, which are not mutually exclusive, are now described in some detail.

In scenario (I), a dynamic scrambling code is used in the generation of a signature that continually encodes the same identifier, and it is of interest to recover the current scrambling code to detect a potential instance of tag cloning. Accordingly, with reference to FIG. 6A, there is shown a system that is similar to the system of FIG. 1. In addition, the system of FIG. 6A comprises a processing entity 610 that implements a validation operation, as will be described herein below. In various embodiments, the processing entity 610 referred to above may be connected to the reader 12, or it may be a remote entity. Such a remote entity may be reachable over a network, or it may be integrated with the reader 12. The system of FIG. 6A also includes a storage entity, such as a database 602, that is accessible to the processing entity 610 and stores a plurality of records 604, each associated with a respective identifier. For the purposes of the present example, one can consider that each identifier for which there exists a record in the database 602 is indicative of a privilege to access certain property or make certain transactions, although other scenarios are possible without departing from the scope of the present invention.

In accordance with one embodiment of the present invention, each of the records 604 also comprises a field 606 indicative of zero or more scrambling codes 608 that were encoded in signatures which were previously received and which encoded the respective identifier for that record. Thus, receipt of a particular signature that encodes the identifier in a given one of the records 604 as well as one of the scrambling code(s) 608 stored in the corresponding field 606 will indicate that the particular signature has been previously received and therefore its instant receipt may be indicative that a cloning attempt has been made.

Figure 7A:
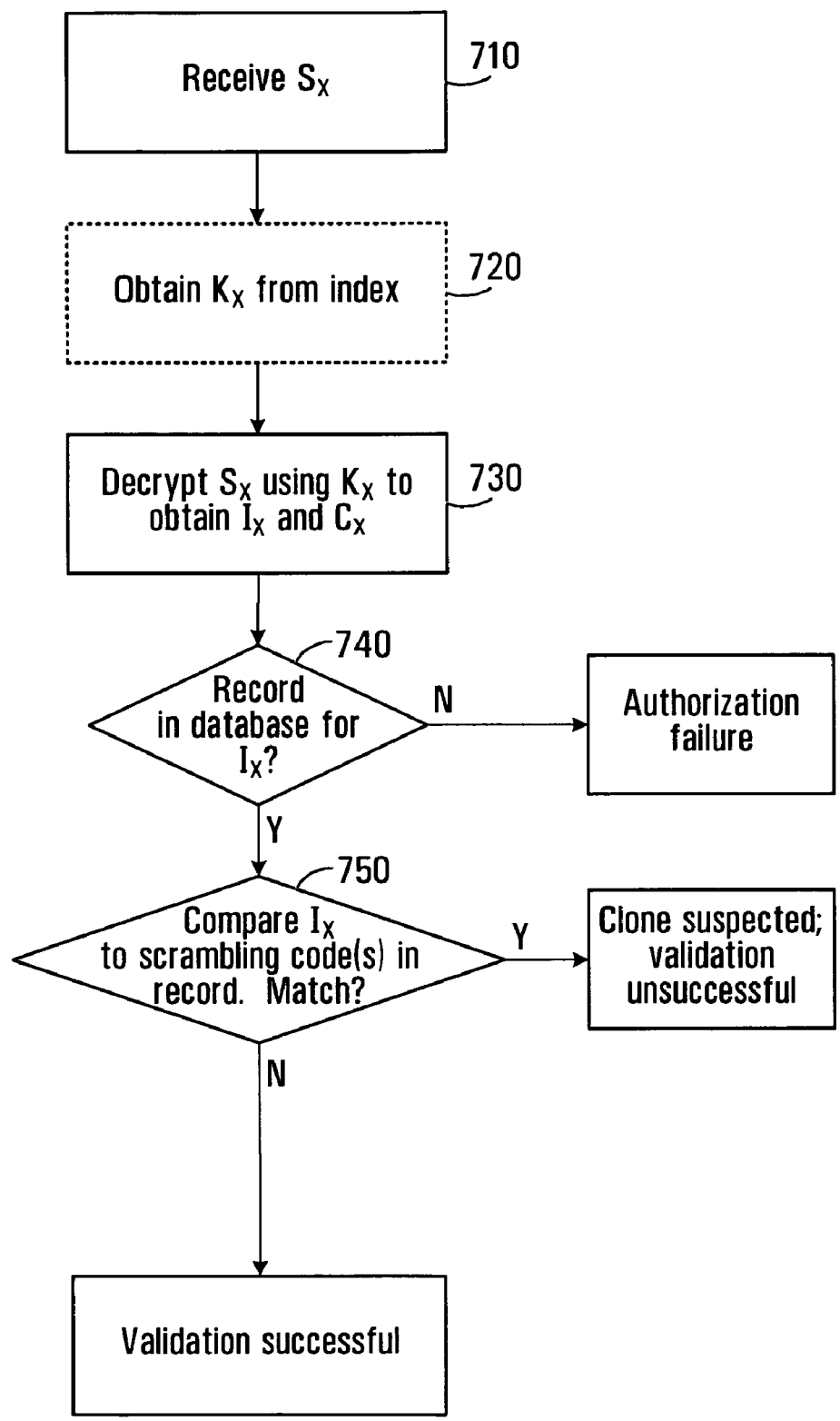
FIG. 7A is a flowchart showing operation of a processing entity of FIG. 6 when considering tags whose signatures encode a variable scrambling code and that are encrypted using a common key that is known to the reader or can be determined from an index supplied with the signature.

More specifically, with reference to the flowchart in FIG. 7A, consider what happens following step 710 when a signature $S_X$ is received at a particular time instant by the reader 12. At the time of receipt, whether the signature $S_X$ encodes any particular identifier or scrambling code is unknown to the reader 12. At step 730, an attempt to decrypt the signature $S_X$ is made by the processing entity 610 using a decryption key $K_X$. The decryption key $K_X$ may be known in advance to the processing entity 610. Alternatively, as shown in step 720, the signature $S_X$ may be accompanied by an index that allows the processing entity 610 to determine the appropriate decryption key $K_X$. The result of the decryption attempt at step 730 is a candidate identifier $I_X$ and a candidate scrambling code, denoted $C_X$.

At step 740, the processing entity 610 consults the database 602 based on the candidate identifier $I_X$ in an attempt to identify a corresponding record and extract therefrom a list of scrambling code(s) that have been received in the past in association with the candidate identifier $I_X$. For the purposes of the present example, it is useful to assume that such a record exists (i.e., the "YES" branch is taken out of step 740), but if there is no such record, this may indicate that there is a high-level failure requiring further action. At step 750, the processing entity 610 compares the candidate scrambling code $C_X$ to the scrambling code(s) 608 in the field 606 of the record identified at step 740 and corresponding to identifier $I_X$.

If there is a match, this indicates that the scrambling code $C_X$ has been used in the past in association with the identifier $I_X$. Under certain conditions, this may lead the processing entity 610 to conclude that the validation operation was unsuccessful.

For example, if the signature $S_X$ was expected to change at least as often as every time that the tag on which it is stored was read, then the fact that the scrambling code $C_X$ matches one of the scrambling code(s) 608 stored in the field 606 of the record corresponding to identifier $I_X$ may lead the processing entity 610 to conclude that the validation operation was unsuccessful. Alternatively, if the signature $S_X$ was expected to change every $N^{th}$ time that the tag on which it is stored was read, then the processing entity 610 may look at how many of the scrambling code(s) 608 stored in the field 606 of the record corresponding to identifier $I_X$ correspond to the scrambling code $C_X$, and if this number is greater than or equal to N, this may lead the processing entity 610 to conclude that the validation operation was unsuccessful. Alternatively still, if the signature $S_X$ was expected to change at least as often as every N seconds etc., then the processing entity 610 may look at how long ago it has been since a matching one of the scrambling code(s) 608 was first stored in the field 606 of the record corresponding to identifier $I_X$, and if this time interval is greater than or equal to a pre-determined number of seconds, minutes, hours, days, etc., this may lead the processing entity 610 to conclude that the validation operation was unsuccessful.

Where a conclusion is reached that the validation operation was unsuccessful, the privilege to access the property or make transactions may be revoked or at least questioned on the basis of suspected tag cloning.

On the other hand, if there is no match between the scrambling code $C_X$ and any of the scrambling code(s) 608 stored in the field 606 of the record corresponding to identifier $I_X$, this may lead the processing entity 610 to conclude that the validation operation was potentially successful. In such a case, the default privilege to access the property or make transactions may be granted (or at least not revoked on the basis of suspected tag cloning).

In accordance with an alternative embodiment of the present invention, the field 606 in the record associated with each particular identifier may be indicative of an "expected" scrambling code, i.e., the scrambling code that should (under valid circumstances) be encoded in a signature received from a tag that encodes the particular identifier. Alternatively, the field 606 in the record associated with each particular identifier may be indicative of an "expected" signature, i.e., the signature that should (under valid circumstances) be received from a tag that encodes the particular identifier. Thus, upon receipt of the signature $S_X$, if it is found to correspond to the expected signature (or if the scrambling code $C_X$ is found to correspond to the expected scrambling code), this may lead the processing entity 610 to conclude that the validation operation was potentially successful. On the other hand, if there is no match between the signature $S_X$ and the expected signature stored in the database 602 (or between the scrambling code $C_X$ and the expected scrambling code), this may lead the processing entity 610 to conclude that the validation operation was unsuccessful.

It should be appreciated that in the above alternative embodiments, the processing entity 610 may obtain knowledge of the expected scrambling code or the expected signature by implementing plural pseudo-random number generators for each of the identifiers, analogous to the pseudo-random number generator 240 implemented by the controller 206 in a given tag 14, which produces an output that depends on one or more previous values of the output and on a seed. Thus, the next output of the pseudo-random number generator implemented by the processing entity 610 for a given identifier allows the processing entity 610 to predict the scrambling code (or the signature) that should be received from a tag legitimately encoding the given identifier. In another embodiment, the processing entity 610 may know what is the expected scrambling code/signature because it has instructed the reader 12 to cause this expected scrambling code/signature to be stored in the memory of the tag.

In accordance with an alternative embodiment of the present invention, the database 602 simply comprises a running list of all signatures that have been received in the past. Thus, upon receipt of the signature $S_X$, if it is found to correspond to one of the signatures on the list, this may lead the processing entity 610 to conclude that the validation operation was unsuccessful. On the other hand, if there is no match between the signature $S_X$ and any of the signatures stored in the database 602, this may lead the processing entity 610 to conclude that the validation operation was potentially successful (or at least not unsuccessful).

It should also be appreciated that having obtained the identifier $I_X$, the processing entity 610 may also perform an action related to identification of an item associated with the particular tag that encoded the identifier $I_X$.

In a first example of an action related to identification, the processing entity 610 may simply note the fact that the item (bearing the identifier $I_X$) was encountered in a vicinity of the reader 12. This information may be stored in a database (not shown) or sent as a message, for example. In an inventory management scenario, the processing entity 610 may consult an inventory list and "check off" the item as having been located, or may signal that the presence of a spurious item (that is not on the inventory list) has been detected.

In another example of an action related to identification, the processing entity 610 may consult another database (not shown) in order to ascertain whether the identifier is on a list of identifiers associated with individuals/objects permitted to access, or prohibited from accessing, certain property. Examples of property include, without limitation: computing equipment, a computer network, a building, a portion of a building, an entrance, an exit and a vehicle.

In another example of an action related to identification, the processing entity 610 may consult another database (not shown) in order to ascertain whether the identifier is on a list of identifiers associated with individuals permitted to effect, or prohibited from effecting, a transaction, which could be a financial transaction or a login to controlled online content, for example.

Figure 7B:
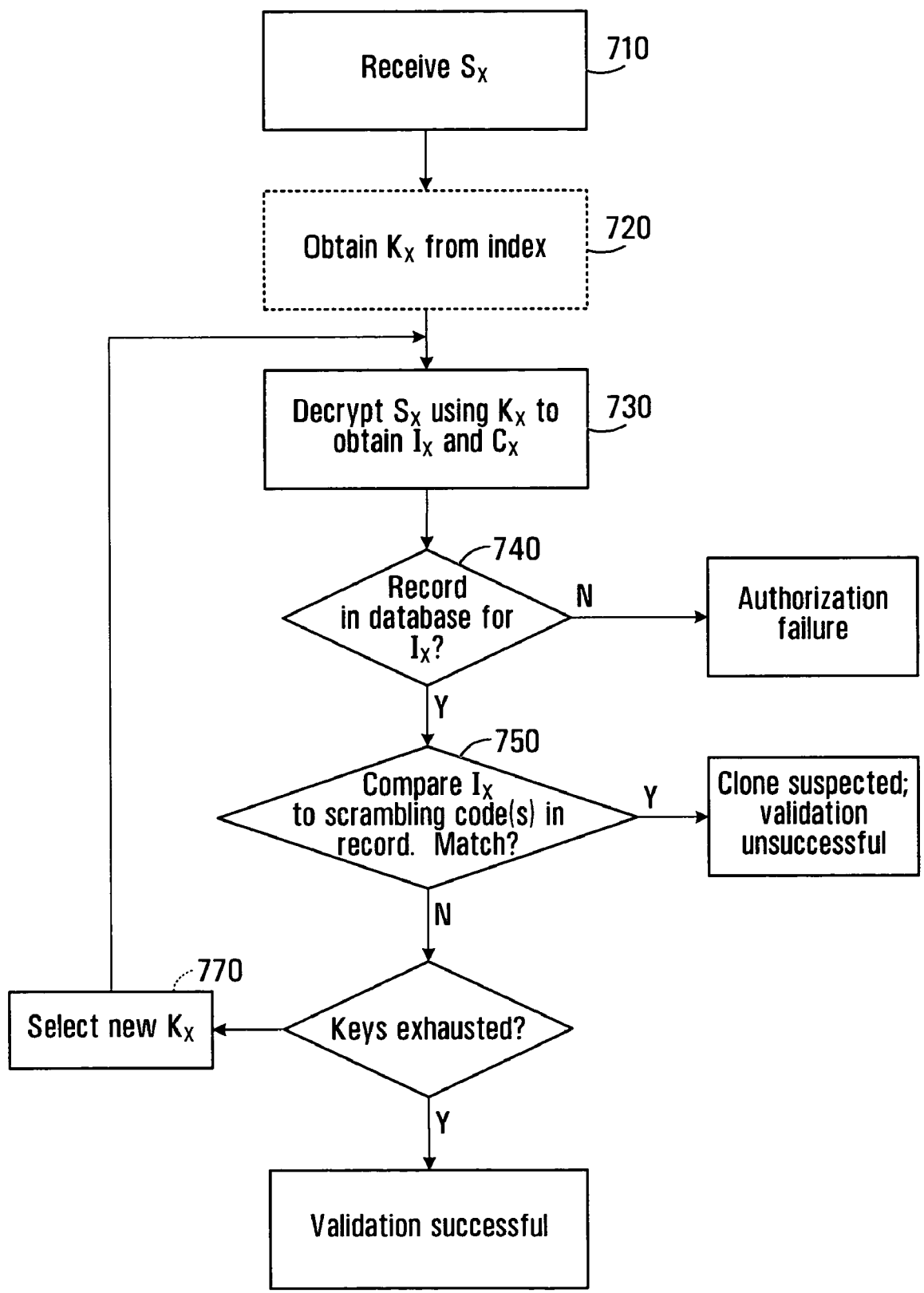
FIG. 7B is a flowchart similar to that of FIG. 7A, but where the common key is unknown to the reader.

FIG. 7B shows a variant where multiple keys are possible but no index (or one that does not permit identification of the appropriate decryption key) is provided along with the signature $S_X$. Specifically, taking the "NO" branch after step 750 does not conclude the validation operation. Rather, the validation operation goes through step 770 where a next key is selected and then the validation operation returns to step 730, whereby steps 730 through 770 are re-executed until the earlier occurrence of (i) taking the "YES" branch at step 750 and (ii) exhaustion of all keys, which can result in the equivalent of taking the "NO" branch out of 740 (i.e., this may indicate that there is a high-level failure requiring further action).

It should be appreciated that in the above embodiments, encryption and decryption can be effected using various techniques known in the art, including encryption using a symmetric key, an asymmetric key pair, a public/private key pair, etc., as well as in accordance with a variety of algorithms and protocols For example, RSA and ECC are suitable examples of asymmetric encryption algorithms, while AES, DES, and Blowfish are suitable examples of symmetric algorithms. Still other possibilities exist and are within the scope of the present invention.

Figure 6A:
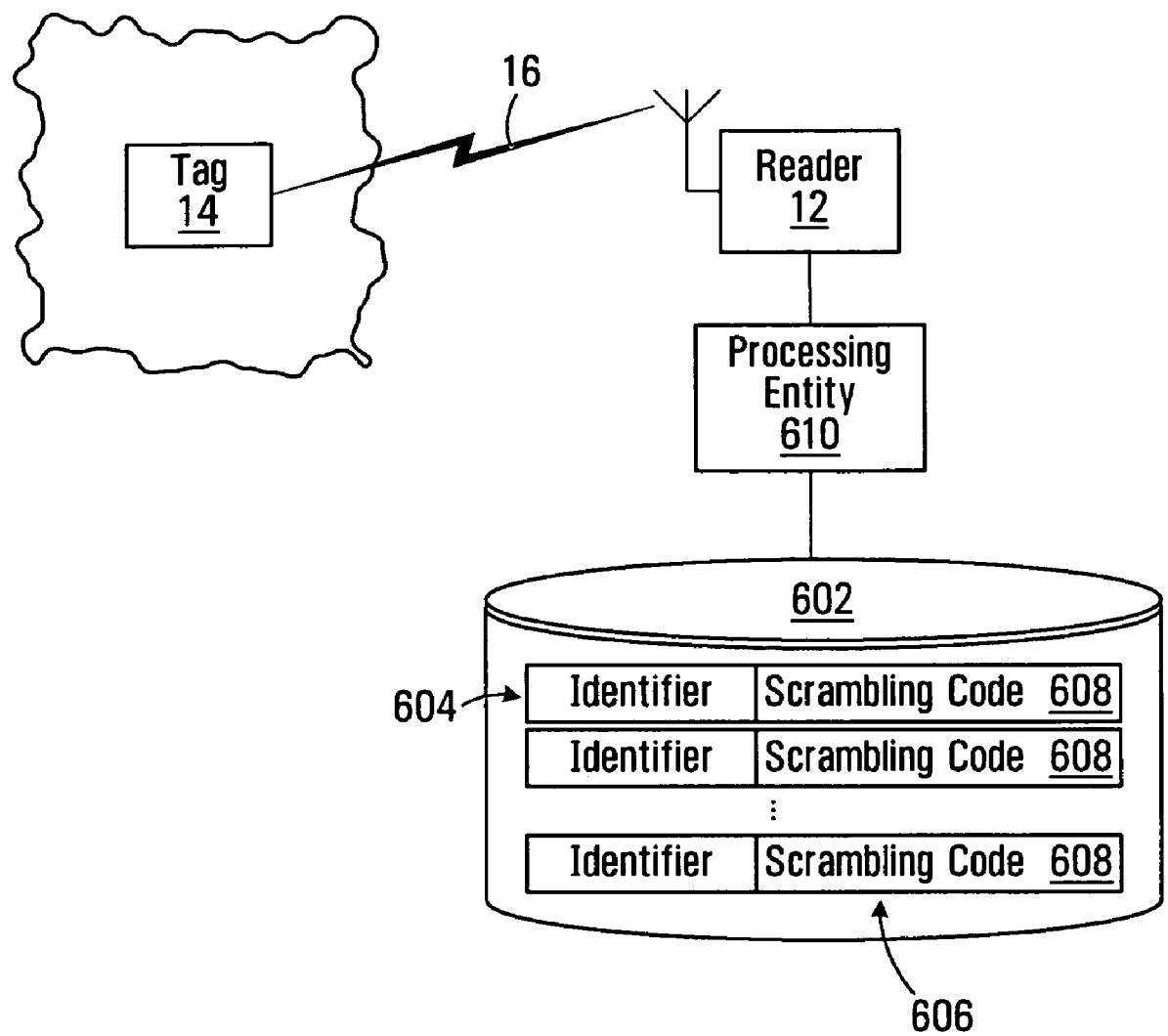
FIG. 6A shows application of a non-limiting embodiment of the present invention in a validation context.
Figure 6B:
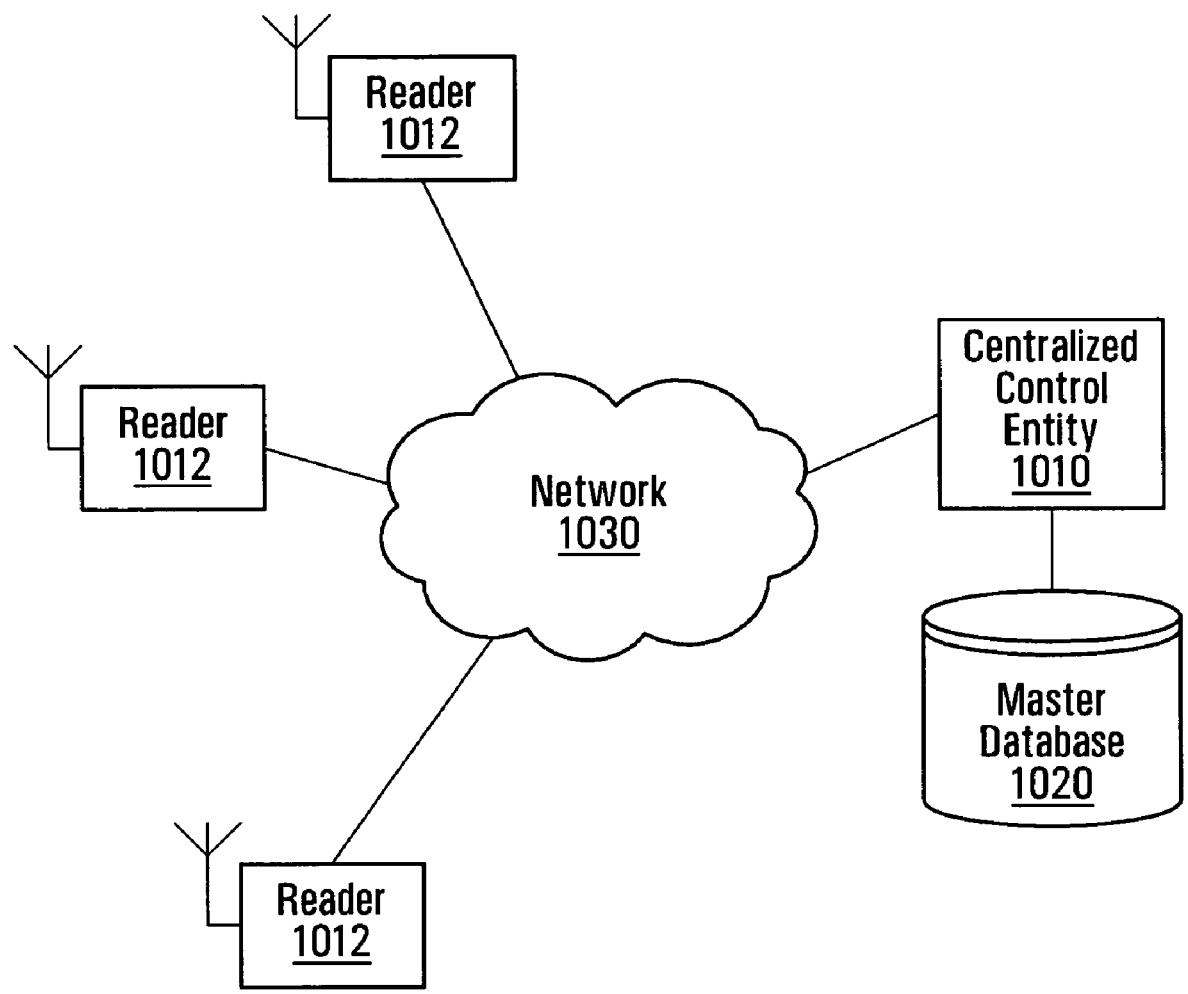
FIG. 6B is a block diagram of a multi-reader architecture, in accordance with a non-limiting embodiment of the present invention.

In the above example with reference to FIGS. 6A, 7A and 7B, although a single reader was described and illustrated, it should be appreciated that it is within the scope of the present invention to provide a multi-reader architecture, as shown in FIG. 6B. A plurality of readers 1012 are connected to each other and to a centralized control entity 1010 by a network 1030, which can be a public packet-switched network, a VLAN, a set of point-to-point links, etc. In such a case, the centralized control entity 1010 (e.g., a network controller) can implement the functionality of the processing entities 610, including encryption and validation. To this end, the centralized control entity 1010 maintains a master database 1020, which includes the equivalent of a consolidated version of various instances of the database 602 previously described as being associated with the reader 12 in the single-reader scenario.

Thus, decryption and validation can be performed entirely in the centralized control entity 1010. Alternatively, certain functionality (such as decryption) can be performed by the readers 1012 while other functionality (such as validation) can be performed by the centralized control entity 1010. Still alternatively, the processing entities 610 can inter-operate amongst themselves in the absence of the centralized entity 1010, thereby to implement decryption on a local basis, and the validation operation in a joint fashion. In such a distributed scenario, the master database 1020 can still be used, or the processing entities 610 can communicate with one another to share information in their respective databases 602.

Figure 8:
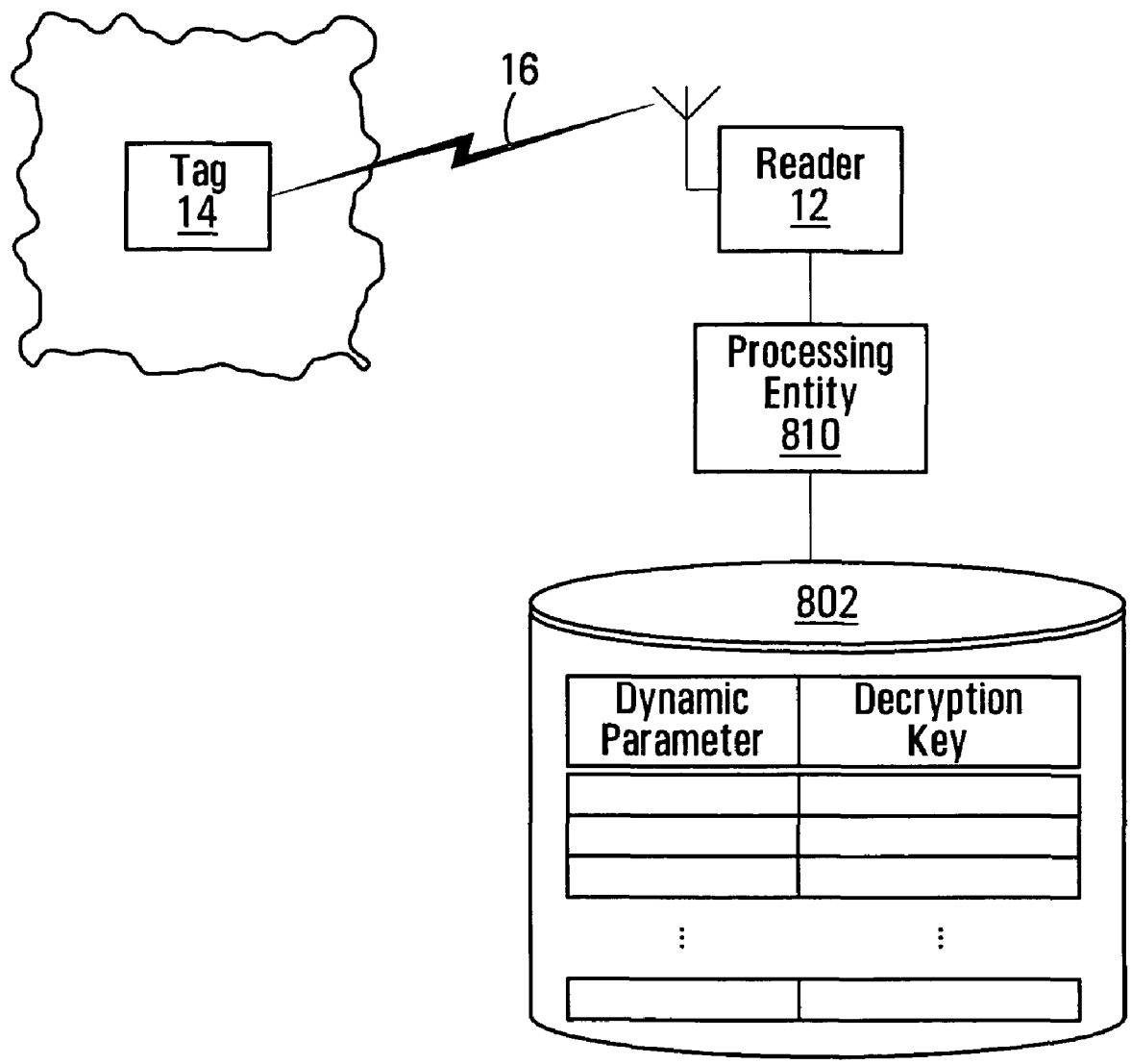
FIG. 8 shows application of a non-limiting embodiment of the present invention in an identification context when considering tags whose signatures are encrypted using a variable key.

In scenario (II), a dynamic key is used in the generation of a signature that encodes a constant identifier, and it is of interest to recover the underlying identifier despite the time-varying key. Accordingly, with reference now to FIG. 8, there is shown a system that is similar to the system of FIG. 1. In addition, the system of FIG. 8 comprises a processing entity 810 that implements an identification operation, as will be described herein below. The processing entity 810 may be connected to the reader 12, or it may be a remote entity. Such a remote entity may be reachable over a network, or it may be integrated with the reader 12. It should be understood that the system in FIG. 8 is being shown separately from the system in FIG. 6; however, it is within the scope of the present invention to combine the functionality of both systems.

Figure 9:
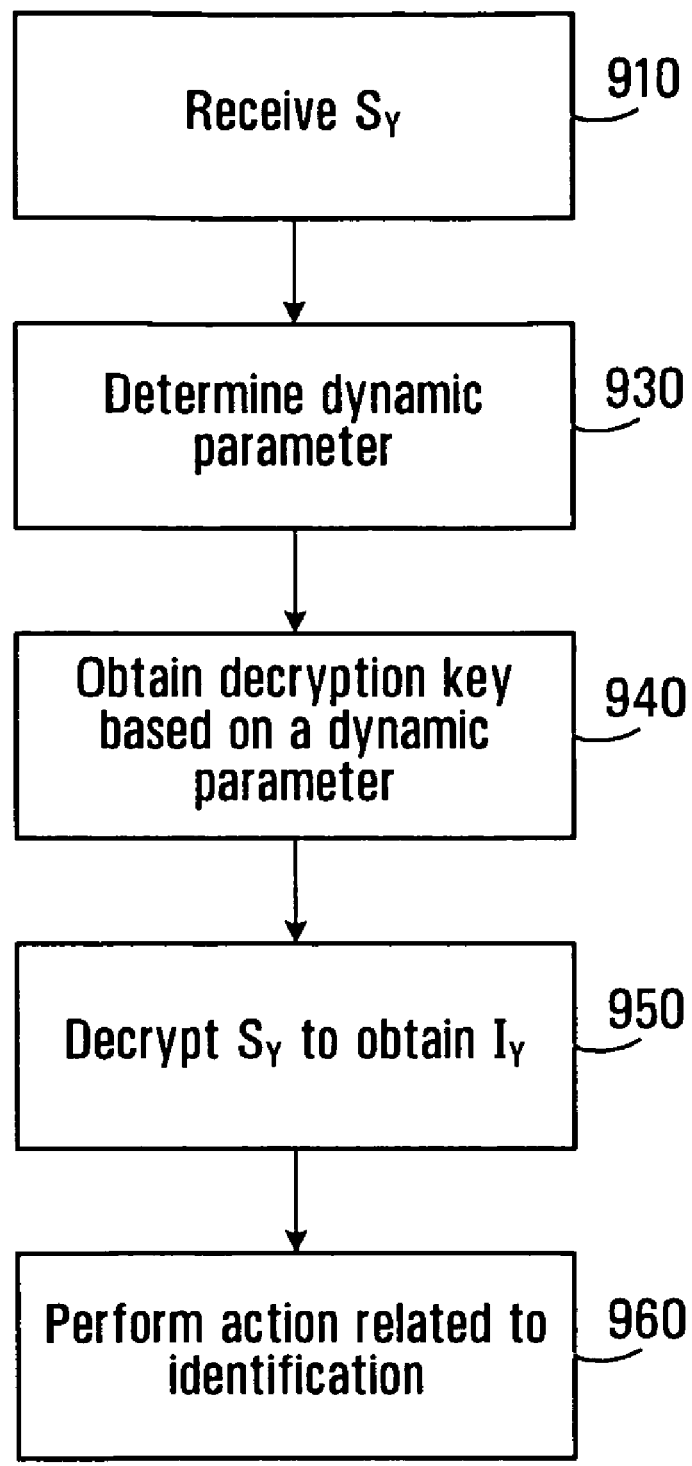
FIG. 9 is a flowchart showing operation of a processing entity of FIG. 8 when considering tags whose signatures are encrypted using a variable key.

With reference to the flowchart in FIG. 9, consider what happens following step 910 when a signature $S_Y$ is received from a particular tag at a particular time instant by the reader 12. The signature $S_Y$ is assumed to have been generated by encrypting an identifier $I_Y$ using an encryption key that varies in a dynamic fashion. To this end, the particular tag may have generated the dynamic encryption key based on, for example:

the output of the aforementioned clock module 260 (e.g., in terms of seconds, minutes or hours of elapsed time since an event known also to the processing entity 810);
the output of the aforementioned geo-location module 250;
an index;
a seed for use by a pseudo-random number generator.

Still other possibilities are within the scope of the present invention. The decryption key can then be determined based on the above quantity. For example, the decryption key could be the above-mentioned output of the clock module or the geo-location module. Alternatively, the encryption key could be the output of a table or a pseudo-random number generator (both known to the processing entity 810) based on the above-mentioned seed, or at a position that corresponds to the above-mentioned index. In the latter case, the index or seed can be supplied along with the signature $S_Y$.

In accordance with the present embodiment, once the signature $S_Y$ is read by the reader 12, the processing entity 810 is expected to determine the appropriate decryption key, denoted $K_Y$. Accordingly, at step 930, the processing entity 810 first determines a dynamic parameter that will allow the decryption key $K_Y$ to be determined. Examples of the dynamic parameter include:

the output of a clock module (which attempts to emulate the aforementioned clock module 260) at the time of receipt of the signature $S_Y$ (e.g., in terms of seconds, minutes or hours of elapsed time since a known event);

the output of a geo-location module (which can be similar to the aforementioned geo-location module 250);

the index or seed provided along with the signature $S_Y$.

Next, at step 940, the processing entity 810 obtains the decryption key $K_Y$ based on the dynamic parameter determined at step 930. For example, where the dynamic parameter corresponds to the output of a clock module or a geo-location module, the decryption key $K_Y$ could be the dynamic parameter itself. Alternatively, where the dynamic parameter is an index or a seed, the decryption key $K_Y$ could be the output of the aforementioned table or pseudo-random number generator known to the processing entity 810, at a position that corresponds to the received index, or using the received seed.

Once the decryption key has been obtained, the signature $S_Y$ is decrypted at step 950 using the decryption key. This leads to extraction of the identifier $I_Y$. It is noted that a scrambling code was not required in this embodiment, although its use is not disallowed.

Having obtained the identifier $I_Y$, the processing entity 810 proceeds to step 960, where it performs an action related to identification of an item associated with the particular tag that encoded the identifier $I_Y$.

In a first example of an action related to identification, the processing entity 810 may simply note the fact that the item (bearing the identifier $I_Y$) was encountered in a vicinity of the reader 12. This information may be stored in a database (not shown) or sent as a message, for example. In an inventory management scenario, the processing entity 810 may consult an inventory list and "check off" the item as having been located, or may signal that the presence of a spurious item (that is not on the inventory list) has been detected.

In another example of an action related to identification, the processing entity 810 may consult another database (not shown) in order to ascertain whether the identifier is on a list of identifiers associated with individuals/objects permitted to access, or prohibited from accessing, certain property. Examples of property include, without limitation: computing equipment, a computer network, a building, a building, a portion of a building, an entrance, an exit and a vehicle.

In yet another example of an action related to identification, the processing entity 810 may consult another database (not shown) in order to ascertain whether the identifier is on a list of identifiers associated with individuals permitted to effect, or prohibited from effecting, a transaction, which could be a financial transaction or a login to controlled online content, for example.

It should be appreciated that the processing entity 810 may also perform an action related to validation of the identifier $I_Y$ in conjunction with the above action related to identification. Specifically, in accordance with one embodiment of the present invention, the processing entity may consult a variant of the aforementioned database 602, where each of the records 604 now includes a field indicative of zero or more signatures which were previously received and which encoded the respective identifier for that record. Thus, receipt of a particular signature that encodes the identifier in a given one of the records 604 as well as one of the signature(s) stored in the corresponding field will indicate that the particular signature has been previously received and therefore its instant receipt may be indicative that a cloning attempt has been made.

In the above example with reference to FIGS. 8 and 9, although a single reader was described and illustrated, it should be appreciated that it is within the scope of the present invention to provide a multi-reader architecture, as in FIG. 6B.

Also, those skilled in the art will appreciate that in some embodiments, the functionality of any or all of the processing entity 610, the processing entity 810, the reader 12 and the readers 1012 may be implemented using pre-programmed hardware or firmware elements (e.g., application specific integrated circuits (ASICs), electrically erasable programmable read-only memories (EEPROMs), etc.), or other related components. In other embodiments, the functionality of the entity in question may be achieved using a computing apparatus that has access to a code memory (not shown) which stores computer-readable program code for operation of the computing apparatus, in which case the computer-readable program code could be stored on a medium which is fixed, tangible and readable directly by the entity in question (e.g., removable diskette, CD-ROM, ROM, fixed disk, USB drive), or the computer-readable program code could be stored remotely but transmittable to the entity in question via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof.

While specific embodiments of the present invention have been described and illustrated, it will be apparent to those skilled in the art that numerous modifications and variations can be made without departing from the scope of the invention as defined in the appended claims.

What is claimed is:

1. A method, comprising:
    obtaining a signature from a contactlessly readable tag;
    decrypting the signature with a key to obtain:
        a candidate identifier, and
        a scrambling code associated with the signature; and
    validating the candidate identifier based on at least one of the scrambling code and the signature;
    wherein validating comprises at least one of: determining whether said signature has been previously received; determining whether said scrambling code was encoded in a previously received signature also encoding the candidate identifier and determining whether said scrambling code or signature corresponds to an expected scrambling code or signature for said tag.

2. The method defined in claim 1, further comprising concluding that said validating is unsuccessful if said determining indicates that said signature has been previously received.

3. The method defined in claim 2, further comprising concluding that said validating is potentially successful if said determining indicates that said signature has not been previously received.

4. The method defined in claim 2, wherein said determining comprises consulting a database of previously received signatures.

5. The method defined in claim 1, further comprising concluding that said validating is unsuccessful if said determining indicates said scrambling code was encoded in a previously received signature also encoding the candidate identifier.

6. The method defined in claim 5, further comprising concluding that said validating is potentially successful if said determining indicates said scrambling code was not encoded in any previously received signature also encoding the candidate identifier.

7. The method defined in claim 5, wherein said determining comprises consulting a database of scrambling codes encoded in previously received signatures also encoding the candidate identifier.

8. The method defined in claim 1, further comprising determining the expected scrambling code or signature for said tag.

9. The method defined in claim 8, wherein determining the expected scrambling code or signature for said tag comprises implementing a pseudo-random number generator that corresponds to a pseudo-random number generator implemented by said tag.

10. The method defined in claim 1, further comprising concluding that said validating is potentially successful if said determining indicates said scrambling code or signature corresponds to the expected scrambling code or signature for said tag.

11. The method defined in claim 10, further comprising concluding that said validating is unsuccessful if said determining indicates said scrambling code or signature does not correspond to the expected scrambling code or signature for said tag.

12. The method defined in claim 1, wherein if said validating is unsuccessful, the method further comprises denying access to property.

13. The method defined in claim 12, wherein said property comprises at least one of: computing equipment, a computer network, a building, a portion of a building, an entrance, an exit and a vehicle.

14. The method defined in claim 1, wherein if said validating is unsuccessful, the method further comprises denying a transaction.

15. The method defined in claim 14, wherein said transaction comprises at least one of: a financial transaction and a login to controlled online content.

16. The method defined in claim 1, further comprising issuing a read request to the tag over a contact-less medium, wherein said obtaining occurs over the contact-less medium in response to issuing the read request.

17. The method defined in claim 1, further comprising performing an action related to identification of an item associated with the tag, based on the identifier.

18. A method, comprising:
obtaining a signature from a contactlessly readable tag;
decrypting the signature with a key to obtain:
a candidate identifier, and
a scrambling code associated with the signature; and
validating the candidate identifier based on at least one of the scrambling code and the signature;
receiving an index accompanying the signature; and
consulting a storage entity that stores potential keys associated with respective indexes to identify said key as the potential key associated with the index accompanying the signature.

19. The method defined in claim 18, wherein if said validating is unsuccessful, the method further comprises denying access to property.

20. The method defined in claim 19, wherein said property comprises at least one of: computing equipment, a computer network, a building, a portion of a building, an entrance, an exit and a vehicle.

21. The method defined in claim 18, wherein if said validating is unsuccessful, the method further comprises denying a transaction.

22. The method defined in claim 21, wherein said transaction comprises at least one of: a financial transaction and a login to controlled online content.

23. The method defined in claim 18, further comprising issuing a read request to the tag over a contact-less medium, wherein said obtaining occurs over the contact-less medium in response to issuing the read request.

24. The method defined in claim 18, further comprising performing an action related to identification of an item associated with the tag, based on the identifier.

25. A method, comprising:
obtaining a signature from a contactlessly readable tag;
decrypting the signature with a key to obtain:
a candidate identifier, and
a scrambling code associated with the signature; and
validating the candidate identifier based on at least one of the scrambling code and the signature; and
consulting a storage entity comprising a plurality of potential keys;
wherein said decrypting is performed using a first one of said potential keys.

26. The method defined in claim 25, said validating comprising:
comparing the candidate identifier to a set of expected identifiers and, if there is no match, repeating said decrypting using another one of said potential keys until occurrence of:
(i) a match between the candidate identifier and one of the expected identifiers; and
(ii) exhaustion of all potential keys without finding a match between the candidate identifier and any of the expected identifiers.

27. The method defined in claim 26, further comprising concluding that said validation was potentially successful in the case of a match between the candidate identifier and one of the expected identifiers.

28. The method defined in claim 27, further comprising concluding that said validation was unsuccessful in the case of exhaustion of all potential keys without finding a match between the candidate identifier and any of the expected identifiers.

29. The method defined in claim 25, wherein if said validating is unsuccessful, the method further comprises denying access to property.

30. The method defined in claim 29, wherein said property comprises at least one of: computing equipment, a computer network, a building, a portion of a building, an entrance, an exit and a vehicle.

31. The method defined in claim 25, wherein if said validating is unsuccessful, the method further comprises denying a transaction.

32. The method defined in claim 31, wherein said transaction comprises at least one of: a financial transaction and a login to controlled online content.

33. The method defined in claim 25, further comprising issuing a read request to the tag over a contact-less medium, wherein said obtaining occurs over the contact-less medium in response to issuing the read request.

34. The method defined in claim 25, further comprising performing an action related to identification of an item associated with the tag, based on the identifier.

35. A computer-readable medium comprising computer-readable program code which, when interpreted by a computing apparatus, causes the computing apparatus to execute a method, the computer-readable program code comprising:
first computer-readable program code for causing the computing apparatus to obtain a signature from a tag;
second computer-readable program code for causing the computing apparatus to decrypt the signature with a key to obtain:
a candidate identifier, and
a scrambling code associated with the signature; and
third computer-readable program code for causing the computing apparatus to validate the candidate identifier based on at least one of the scrambling code and the signature;
wherein validating comprises at least one of: determining whether said signature has been previously received; determining whether said scrambling code was encoded in a previously received signature also encoding the candidate identifier and determining whether said scrambling code or signature corresponds to an expected scrambling code or signature for said tag.

36. A system, comprising:
at least one tag reader configured to receive a plurality of signatures released by a respective plurality of tags, including a particular signature released by a particular one of the tags, and to cause decryption of the particular signature with a key to obtain:
a candidate identifier, and
a scrambling code associated with the signature; and
a processing entity configured to effect validation of the candidate identifier based on at least one of the scrambling code and the signature;
wherein to effect said validation, said processing entity is configured to effect at least one of (i) a determination of whether said signature has been previously received; (ii) a determination of whether said scrambling code was encoded in a previously received signature also encoding the candidate identifier; (iii) a determination of a number of times that said signature has been previously received; and (iv) a determination of how long ago said signature was first received.

37. The system defined in claim 36, the at least one tag reader being further configured to effect said decryption.

38. The system defined in claim 36, further comprising a network controller communicatively coupled to the at least one tag reader and configured to effect said decryption.

39. The system defined in claim 36, wherein the processing entity is comprised in the at least one tag reader.

40. The system defined in claim 36, further comprising a network controller communicatively coupled to the at least one tag reader and configured to implement said processing entity.

41. The system defined in claim 40, wherein the network controller is further configured to effect said decryption.

42. The system defined in claim 36, wherein said processing entity is further configured to conclude that said validation is unsuccessful if said determination is indicative of said signature having been previously received.

43. The system defined in claim 42, wherein the at least one tag reader comprises a plurality of tag readers spatially distributed over a plurality of sites, wherein said processing entity is distributed among the plurality of tag readers.

44. The system defined in claim 43, wherein the plurality of tag readers are communicatively coupled to one another to enable said determination to be made jointly by the plurality of tag readers.

45. The system defined in claim 36, wherein said processing entity is further configured to conclude that said validation is unsuccessful if said determination is indicative of said scrambling code having been encoded in a previously received signature also encoding the candidate identifier.

46. The system defined in claim 45, wherein the at least one tag reader comprises a plurality of tag readers spatially distributed over a plurality of sites, wherein said processing entity is distributed among the plurality of tag readers.

47. The system defined in claim 46, wherein the plurality of tag readers are communicatively coupled to one another to enable said determination to be made jointly by the plurality of tag readers.

48. The system defined in claim 36, wherein said processing entity is further configured to conclude that said validation is unsuccessful if said determination is indicative of said signature having been previously received more than a pre-determined number of times.

49. The system defined in claim 36, wherein said processing entity is further configured to conclude that said validation is unsuccessful if said determination is indicative of said signature having been first received more than a pre-determined time interval ago.

50. The system defined in claim 36, wherein the at least one tag reader comprises a plurality of tag readers spatially distributed over a plurality of sites.

51. The system defined in claim 36, wherein if said validation is unsuccessful, said processing entity is further configured to deny access to property.

52. The system defined in claim 51, wherein said property comprises at least one of: computing equipment, a computer network, a building, a portion of a building, an entrance, an exit and a vehicle.

53. The system defined in claim 36, wherein if said validation is unsuccessful, said processing entity is further configured to deny a transaction.

54. The system defined in claim 53, wherein said transaction comprises at least one of: a financial transaction and a login to controlled online content.

55. A system, comprising:
means for receiving a plurality of signatures released by a respective plurality of tags, including a particular signature released by a particular one of said tags;
means for decrypting the particular signature with a key to obtain (I) a candidate identifier, and (II) a scrambling code associated with the signature; and
means for validating the candidate identifier based on at least one of the scrambling code and the signature;
wherein to effect said validation, said processing entity is configured to effect at least one of (i) a determination of whether said signature has been previously received; (ii) a determination of whether said scrambling code was encoded in a previously received signature also encoding the candidate identifier; (iii) a determination of a number of times that said signature has been previously received; and (iv) a determination of how long ago said signature was first received.

56. A computer-readable medium comprising computer-readable program code which, when interpreted by a computing apparatus, causes the computing apparatus to execute a method, the computer-readable program code comprising:
- first computer-readable program code for causing the computing apparatus to obtain a signature from a tag;
- second computer-readable program code for causing the computing apparatus to decrypt the signature with a key to obtain:
  - a candidate identifier, and
  - a scrambling code associated with the signature; and
- third computer-readable program code for causing the computing apparatus to validate the candidate identifier based on at least one of the scrambling code and the signature;
- fourth computer-readable program code for causing the computing apparatus to receive an index accompanying the signature; and
- fifth computer-readable program code for causing the computing apparatus to consult a storage entity that stores potential keys associated with respective indexes to identify said key as the potential key associated with the index accompanying the signature.

57. A computer-readable medium comprising computer-readable program code which, when interpreted by a computing apparatus, causes the computing apparatus to execute a method, the computer-readable program code comprising:
- first computer-readable program code for causing the computing apparatus to obtain a signature from a tag;
- second computer-readable program code for causing the computing apparatus to decrypt the signature with a key to obtain:
  - a candidate identifier, and
  - a scrambling code associated with the signature; and
- third computer-readable program code for causing the computing apparatus to validate the candidate identifier based on at least one of the scrambling code and the signature;
- fourth computer-readable program code for causing the computing apparatus to consult a storage entity comprising a plurality of potential keys;
- wherein decrypting of the signature is performed using a first one of said potential keys.

* * * * *